(12) United States Patent
Kaneko

(10) Patent No.: US 6,717,747 B2
(45) Date of Patent: Apr. 6, 2004

(54) IMAGE PICKUP LENS

(75) Inventor: Isamu Kaneko, Kawaguchi (JP)

(73) Assignee: Enplas Corporation, Saitama (JP)

( * ) Notice: Subject to any disclaimer, the term of this patent is extended or adjusted under 35 U.S.C. 154(b) by 45 days.

(21) Appl. No.: 09/924,020

(22) Filed: Aug. 7, 2001

(65) Prior Publication Data

US 2002/0054438 A1 May 9, 2002

(30) Foreign Application Priority Data

Aug. 7, 2000 (JP) ........................................ 2000-238951

(51) Int. Cl.$^7$ ................................................ G02B 3/08
(52) U.S. Cl. ........................ 359/742; 359/743; 359/718
(58) Field of Search ................................ 359/718, 719, 359/742, 743; 369/112.03–112.08, 112.11–112.13, 112.23

(56) References Cited

U.S. PATENT DOCUMENTS

| | | | |
|---|---|---|---|
| 3,162,766 A | | 12/1964 | Ploke |
| 3,653,751 A | | 4/1972 | Hofmann et al. |
| 3,743,385 A | * | 7/1973 | Schaefer ..................... 359/718 |
| 4,787,722 A | | 11/1988 | Claytor |
| 5,161,040 A | * | 11/1992 | Yokoyama et al. ........... 359/19 |
| 5,731,914 A | * | 3/1998 | Meyers ........................ 359/742 |
| 5,796,520 A | * | 8/1998 | Maruyama ................... 359/565 |
| 5,936,782 A | | 8/1999 | Nomura et al. |
| 6,266,476 B1 | * | 7/2001 | Shie et al. ................... 385/147 |
| 6,292,629 B1 | | 9/2001 | Sensui |

FOREIGN PATENT DOCUMENTS

| | | |
|---|---|---|
| DE | 199 62 712 | 6/2000 |
| RU | 2 106 713 | 3/1998 |

OTHER PUBLICATIONS

Joseph Morgan, Introduction to Geometrical and Physical Optics, 1953, (McGraw–Hill, New York), pp. 114–121.*

* cited by examiner

Primary Examiner—Georgia Epps
Assistant Examiner—Deborah A. Raizen
(74) Attorney, Agent, or Firm—Koda & Androlia

(57) ABSTRACT

In an image pickup lens including a lens body, at least one of faces of the lens body is formed into an aspherical shape, and at least one of a first face of the lens body adjacent an object and a second face of said lens body adjacent an image pickup surface is a Fresnel face. Thus, the image pickup lens can be reduced in size, and the optical characteristics of the image pickup lens can be enhanced remarkably in a simple structure.

7 Claims, 17 Drawing Sheets

FIG. 2
PRIOR ART
CHROMATIC ABERRATION OF MAGNIFICATION
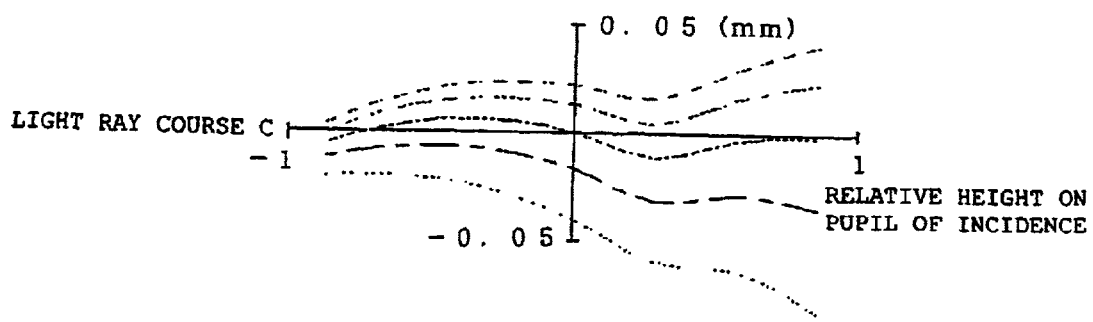
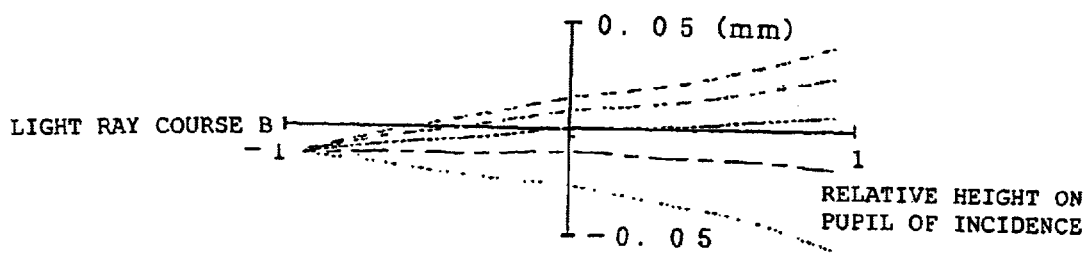
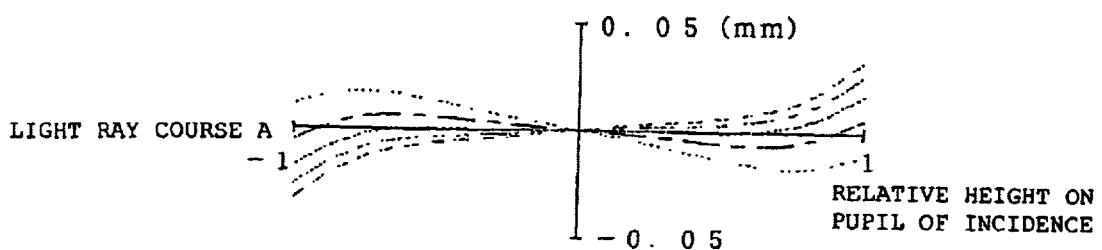

FIG. 7
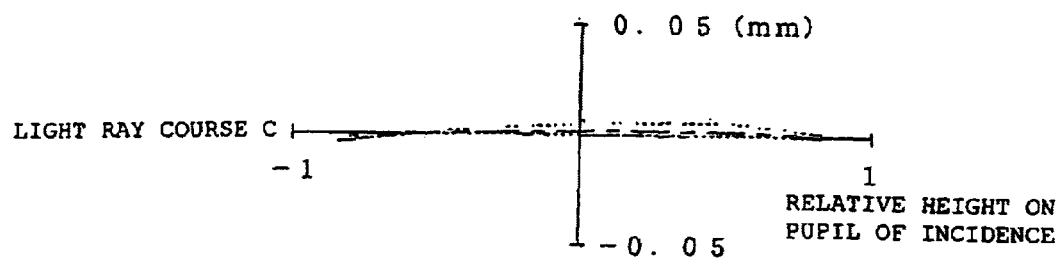
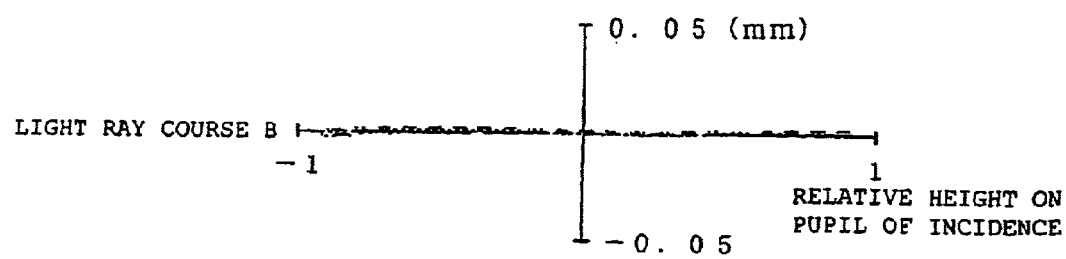
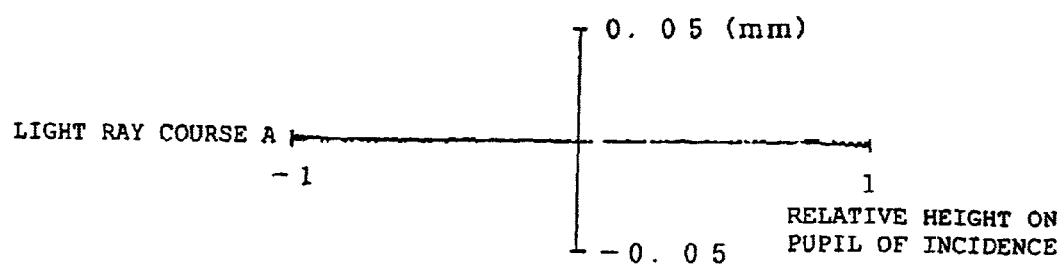

F I G. 1 0
CHROMATIC ABERRATION OF MAGNIFICATION
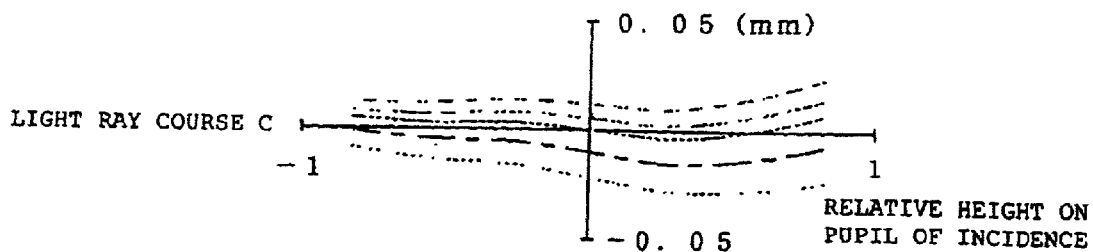
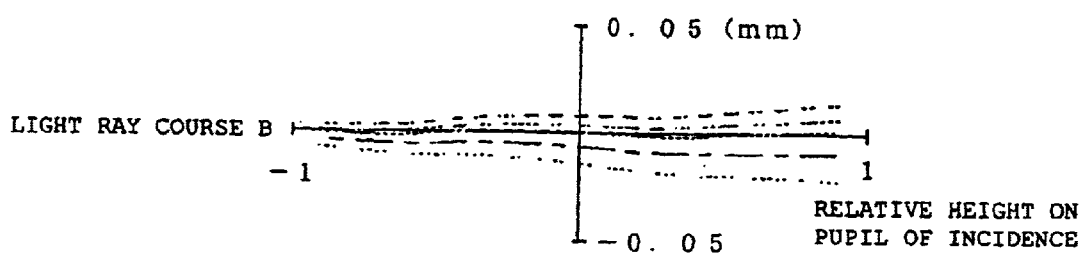
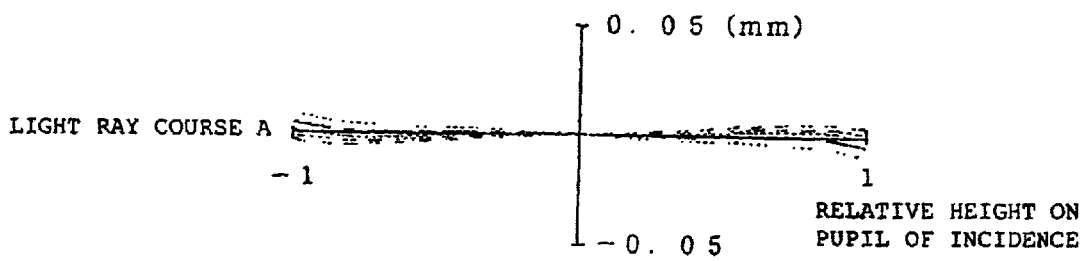

FIG. 13
CHROMATIC ABERRATION OF MAGNIFICATION
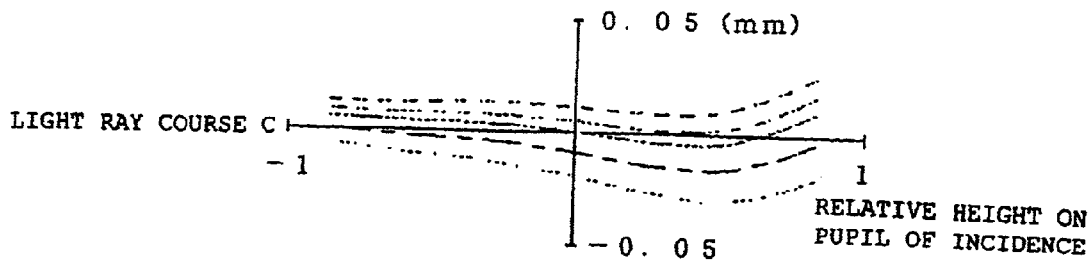
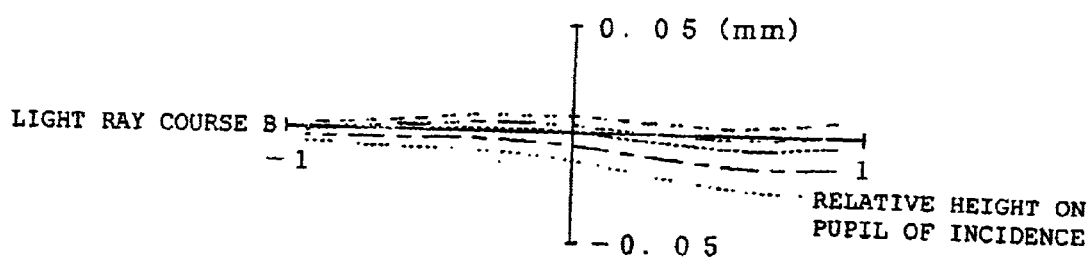
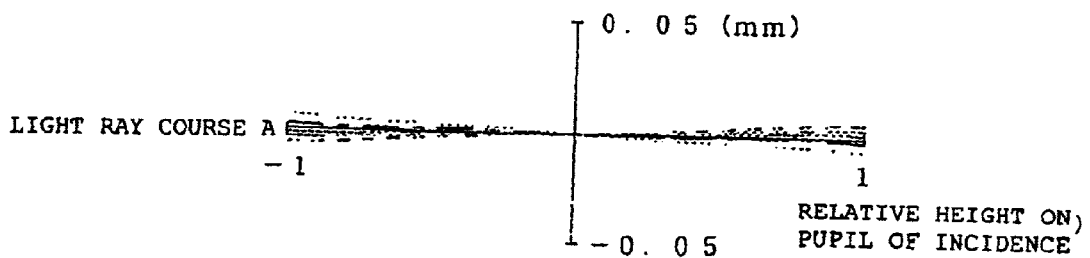

FIG. 16
CHROMATIC ABERRATION OF MAGNIFICATION
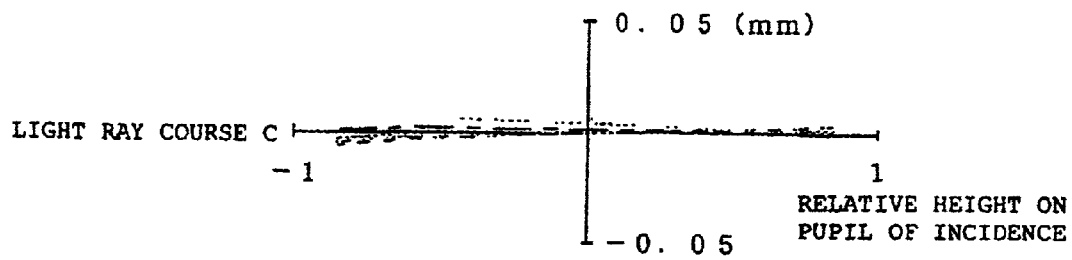
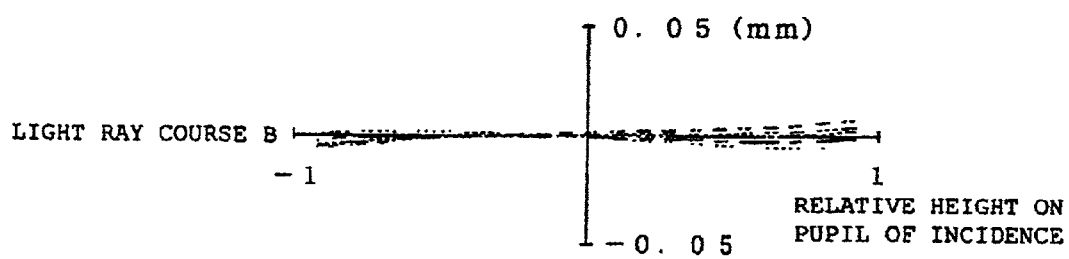
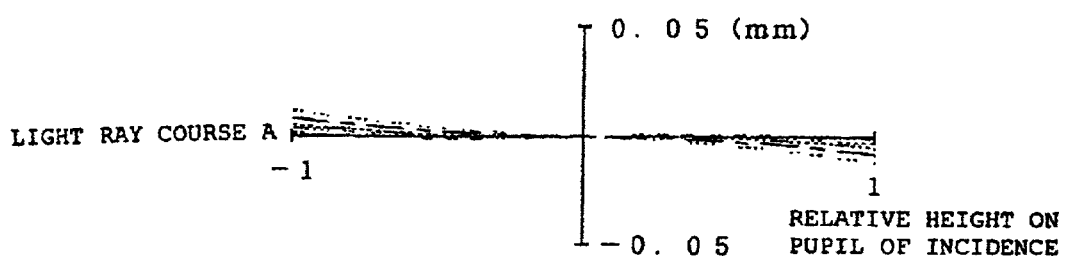

IMAGE PICKUP LENS

BACKGROUND OF THE INVENTION

1. Field of the Invention

The present invention relates to an image pickup lens and particularly, to an image pickup lens of a single-piece construction, which is used in an image pick-up device e.g., a CCD camera, utilizing an image pickup element such as CCD, CMOS and the like mounted on a portable computer, a visual telephone, a portable telephone and the like, and which can be reduced in size and weight.

2. Description of the Related Art

In recent years, multimedia have been developed remarkably, and for example, the demand for a camera utilizing image pickup element such as CCD, CMOS and the like, e.g., a CCD camera mounted on a portable computer, a visual telephone, a portable telephone and the like, is being increased remarkably. Such a CCD camera is required to be mounted in a limited space and for this reason, it is desired that the CCD camera is small in size and lightweight.

Therefore, it is also desired that an image pickup lens used in such a CCD camera is likewise small in size and lightweight.

A so-called single lens made using a single lens piece is conventionally used as such an image pickup lens.

FIG. 1 shows such a conventional image pickup lens of a single-piece type. The lens includes a lens body 10 constituted by a positive lens. A diaphragm 11 is disposed at a location displaced from the lens body 10 toward an object. A first cover glass 12, a second cover glass 13 and an image pickup surface 14 which is a light-receiving surface of an image pickup element such as CCD or CMOS, are disposed sequentially at locations displaced from the lens body 10 toward an image surface. Lens faces of the lens body 10 are called a first face and a second face disposed sequentially in the named order from the side of the object.

The image pickup lens is set under the following conditions:

f=4.10 mm; F=2.2; 2ω=60.0; Petzval sum=0.681 wherein f represents a maximum focal length; F represents an F-number; and 2ω represents an angle of view. If an X-axis is taken in a direction of an optical axis, and an z-axis is taken in a direction perpendicular to the optical axis, and if a direction of travel of light is defined to be positive, the aspherical shape of the lens is represented by the following equation:

$$Z = \frac{\frac{x^2}{r}}{1+\sqrt{1-(k+1)\frac{x^2}{r^2}}} + ax^4 + bx^6$$

wherein each of k, a and b is an aspherical factor.

| Face | Radius r of curvature | Distance d | Refractive index nd | Abbe constant vd |
|---|---|---|---|---|
| (1) Diaphragm | 0.0000 | 0.629 | | |
| (2) First face of lens | 49.774 | 2.871 | 1.584 | 31.0 |
| (3) Second face of lens | −2.477 | 1.000 | | |
| (4) First face of first cover glass | 0.000 | 0.750 | 1.517 | 64.0 |
| (5) Second face of first cover glass | 0.000 | 0.250 | | |
| (6) First face of second cover glass | 0.000 | 1.200 | 1.517 | 64.0 |
| (7) Second face of second cover glass | 0.000 | 1.518 | | |
| (8) Image pickup surface | 0.000 | | | |

| | K | A | B |
|---|---|---|---|
| 2 | 1.468005e+003 | −1.312730e−002 | −7.674194e−003 |
| 3 | −1.315709e+000 | −4.263500e−002 | −1.495094e−003 |

However, such conventional image pickup lens suffers from a problem that a good image surface cannot be provided, because of a large Petzval sum and a large image surface curvature. In addition, various aberrations such as a longitudinal chromatic aberration, a chromatic aberration of magnification, a spherical aberration, an astigmatism and the like are large and cannot be corrected appropriately and hence, good optical characteristics cannot be provided.

FIG. 2 shows chromatic aberrations of magnification in light ray courses A, B and C in the image pickup lens shown in FIG. 1. It can be seen from FIG. 2 that each of the chromatic aberrations of magnification is large and particularly, is large in a region around the image pickup lens, thereby bringing degradations in lens characteristics. A spherical aberration, an astigmatism and a distortion in the image pickup lens are shown in FIG. 3. It can be seen from FIG. 3 that all of the spherical aberration, the astigmatism and the distortion are large and particularly, the spherical aberration and the astigmatism are large and hence, sufficient optical characteristics cannot be provided.

SUMMARY OF THE INVENTION

Accordingly, it is an object of the present invention to provide an image pickup lens, which can be reduced in size and whose optical characteristics can be enhanced remarkably in a simple structure.

To achieve the above object, according to the present invention, there is provided an image pickup lens including a lens body, wherein at least one of faces of the lens body is formed into an aspherical shape, and at least one of a first face of the lens body adjacent an object and a second face of the lens body adjacent an image pickup surface is a Fresnel face.

According to a second aspect and feature of the present invention, in addition to the first feature, the lens body is comprised of a single lens piece.

With such configuration of the above feature, at least one of the faces of the lens body is formed into an aspherical shape, and at least one of the first face of the lens body adjacent the object and the second face of the lens body adjacent the image pickup surface is the Fresnel face.

Therefore, the Petzval sum can be reduced to reduce the image surface curvature, thereby providing a good image surface. In addition, various aberrations such as a spherical aberration and the like can be corrected appropriately and hence, the optical characteristics of the image pickup lens can be enhanced remarkably.

According to a third aspect and feature of the present invention, in addition to the first feature, the lens body is formed of a first lens piece and a second lens piece bonded to each other.

With such configuration of the third feature, the lens body is formed of the first and second lens pieces bonded to each other. Therefore, various aberrations, particularly, the chromatic aberration can be corrected satisfactorily and hence, the optical characteristics of the image pickup lens can be enhanced.

The above and other objects, features and advantages of the invention will become apparent from the following description of the preferred embodiment taken in conjunction with the accompanying drawings.

BRIEF DESCRIPTION OF THE DRAWINGS

FIG. 2 is a diagram showing chromatic aberrations of magnification of the image pickup lens shown in FIG. 1.

FIG. 7 is a diagram showing chromatic aberrations of magnification of the image pickup lens shown in FIG. 6;

FIG. 10 is a diagram showing chromatic aberration of magnifications of the image pickup lens shown in FIG. 9;

FIG. 13 is a diagram showing chromatic aberrations of magnification of the image pickup lens shown in FIG. 12;

FIG. 16 is a diagram showing chromatic aberrations of magnification of the image pickup lens shown in FIG. 15;

DESCRIPTION OF THE PREFERRED EMBODIMENTS

The present invention will now be described by way of an embodiment shown in the accompanying drawings.

Figure 1:
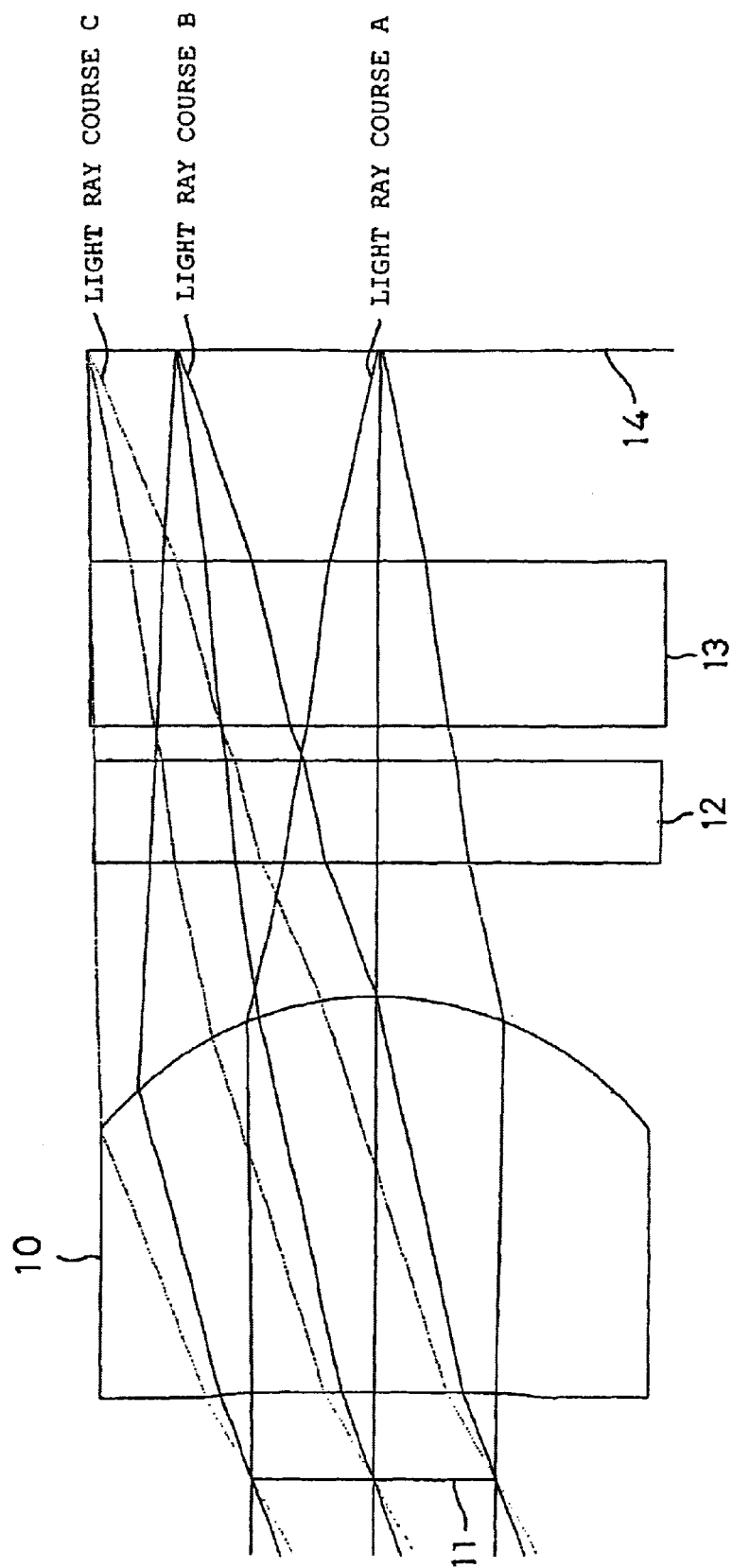
FIG. 1 is an illustration of a conventional image pickup lens.
Figure 3:
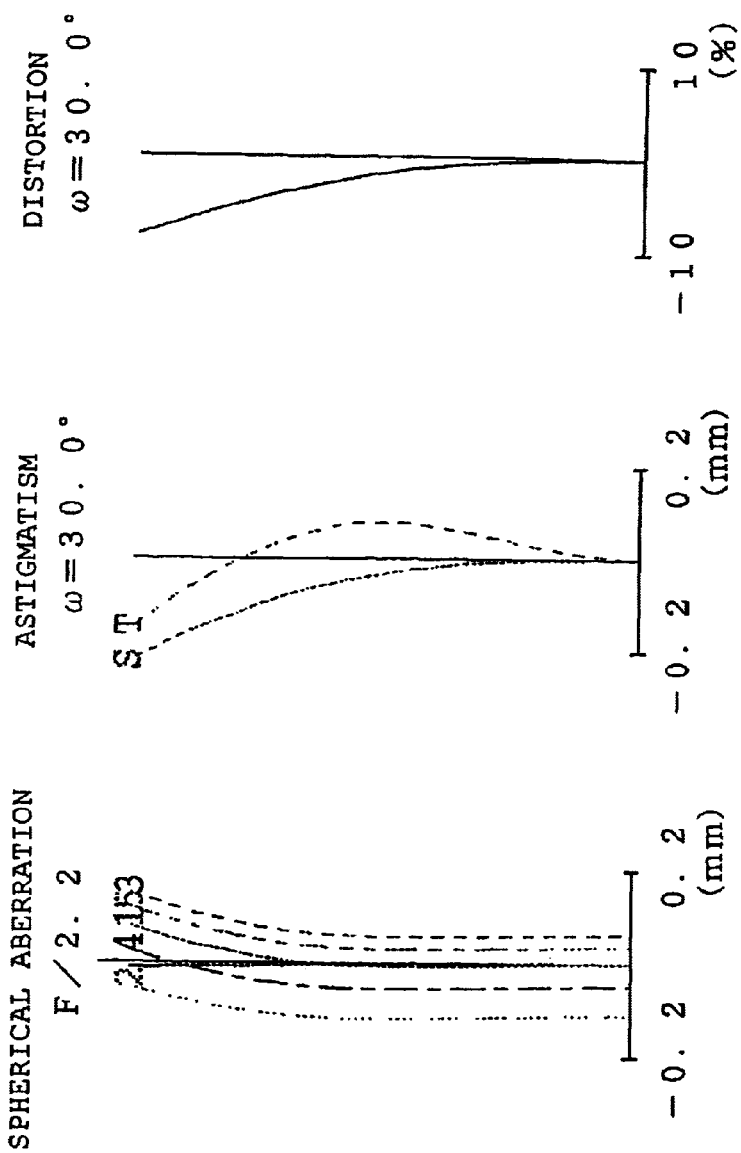
FIG. 3 is a diagram showing spherical aberrations, astigmatisms and distortions of the image pickup lens shown in FIG. 1.
Figure 4:
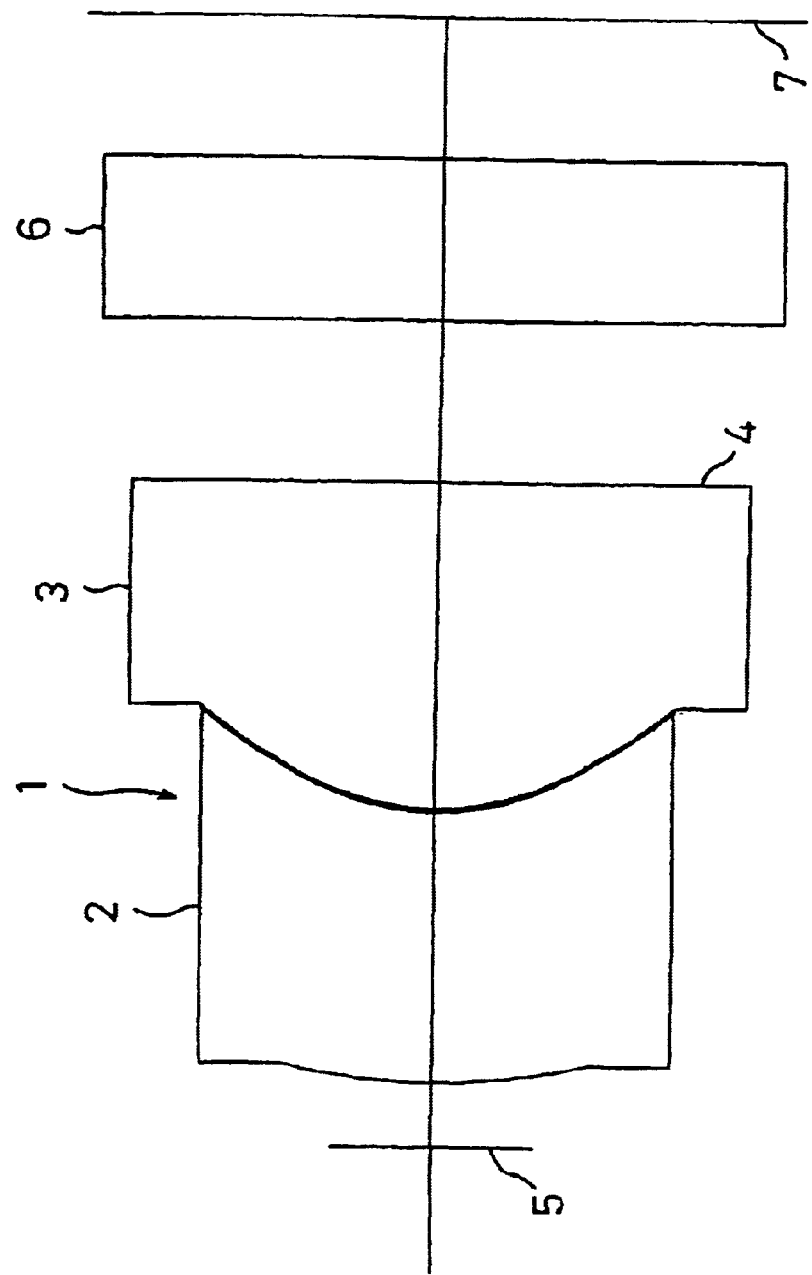
FIG. 4 is an illustration of an arrangement of an embodiment of an image pickup lens according to the present invention.

FIG. 4 shows a basic structure of an image pickup lens according to the present invention. The image pickup lens includes a lens body 1 made of, for example, a resin such as a plastic. In the present embodiment, the lens body 1 comprises a first lens piece 2 formed as a concave lens and located on the side of an object, and a second lens piece formed as a convex lens and located on the side of an image pickup surface. The first and second lens pieces 2 and 3 are integrally bonded to each other. The first lens piece 2 is formed of a material having a large color dispersion and a small Abbe constant, e.g., a polyester-based resin, and the second lens piece 3 is formed of a material a small color dispersion and a large Abbe constant, e.g., a cyclo-olefin copolymer-based resin.

The first and second lens pieces 2 and 3 are bonded integrally to each other, for example, by an acrylic ultraviolet-curing adhesive. Alternatively, the first and second lens pieces 2 and 3 may be formed integrally with each other without use of an adhesive by another means, for example, by first forming the first lens piece 2 and then forming the second lens piece 3 integrally with the first lens piece 2.

In the present embodiment, at least one of faces of the first lens piece 2 or the second lens piece 3 is formed into an aspherical shape, and a second face of at least the second lens piece 3 adjacent the image pickup surface is Fresnel face 4. It is more preferable that the Fresnel face 4 has a finer ruggedness, but it is desirable that the Fresnel face 4 is formed at a ruggedness as fine as not to provide an adverse affection due to the diffraction. Further, an optical face portion (a stepped portion) unavailable from the viewpoint of an optical design and present in the Fresnel face 4 may be subjected to a light-shielding treatment.

A diaphragm 5 is disposed at a location displaced from the lens body 1 toward the object, and a cover glass 6 and an image pickup surface 7 which is a light-receiving surface of an image pickup element such as CCD or CMOS are disposed at a location adjacent the second face of the second lens piece 3 of the lens body 1.

In the present embodiment, the lens body 1 is formed by bonding the first and second lens pieces 2 and 3 formed of the materials having the different color dispersions and the different Abbe numbers, and at least one of the faces other than the bonded faces is the Fresnel face 4. Therefore, the Petsval sum can be reduced to reduce the curvature of image surface, thereby providing a good image surface, and various aberrations, particularly, the chromatic aberrations of magnification and the spherical aberration can be reduced, leading to remarkably enhanced optical characteristics of the pickup lens.

Figure 5:
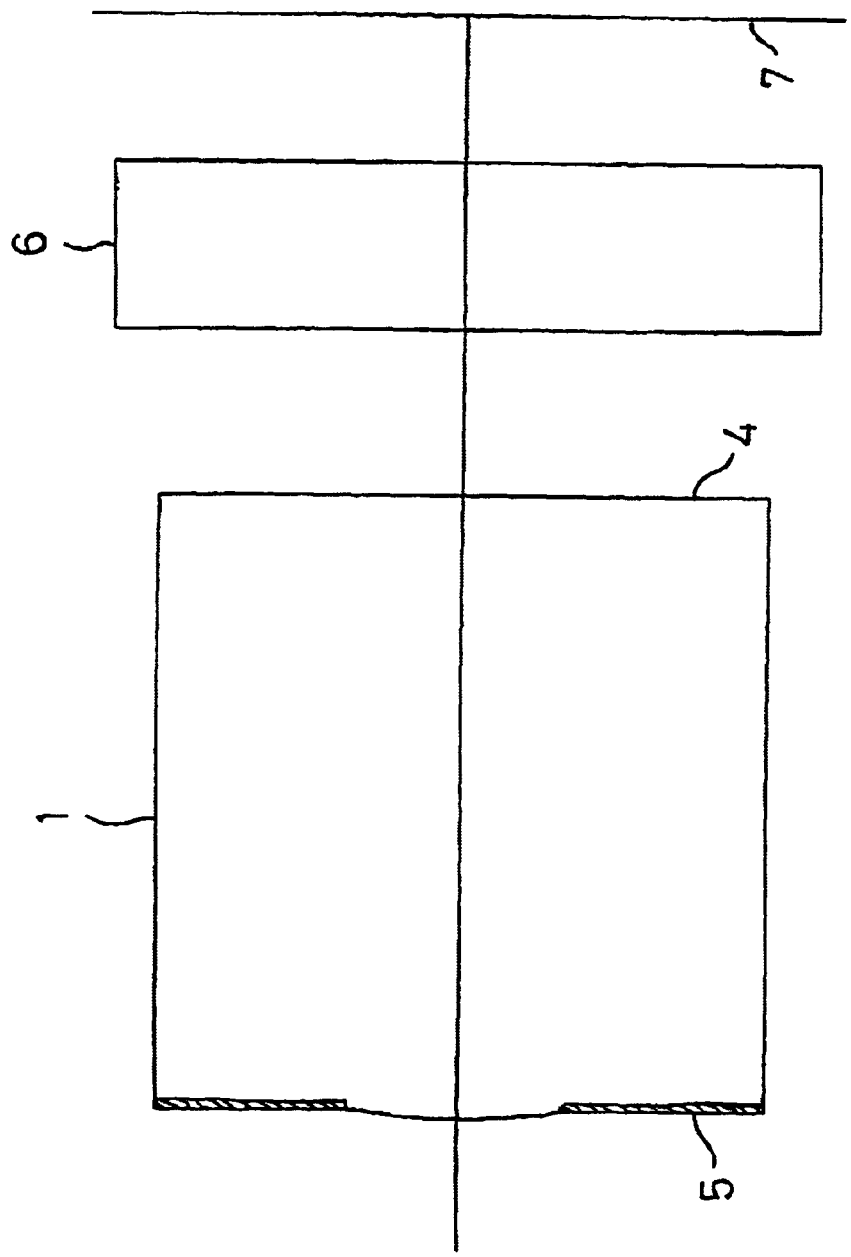
FIG. 5 is an illustration of an arrangement of another embodiment of an image pickup lens according to the present invention.

FIG. 5 shows another embodiment of the present invention. In this embodiment, a lens body 1 is constituted by a single lens piece, and a second surface of the lens body 1 adjacent an object is a Fresnel face 4. A diaphragm 5 is integrally formed on a first face of the lens body 1 adjacent an object.

Even in this embodiment, the Petzvel sum can be reduced by forming the Fresnel face 4, thereby reducing the image surface curvature to provide a good image surface, as in the previous embodiment. In addition, the various aberrations such as the spherical aberration and the like can be corrected appropriately to provide a lens having good optical characteristics.

EXAMPLES

Examples of the present invention will be described below with reference to FIGS. 6 to 17.

In the examples, f represents a focal length; F represents an F-number; and 2ω represents an angle of view. If a Z-axis is taken in a direction of an optical axis, and an X-axis is taken in a direction perpendicular to the optical axis, and if a direction of travel of light is defined to be positive, the aspherical shape of a lens is represented by the following equation:

$$Z = \frac{\frac{x^2}{r}}{1 + \sqrt{1 - (k+1)\frac{x^2}{r^2}}} + ax^4 + bx^6$$

wherein each of k, a and b is an aspherical factor.

Example 1

Figure 6:
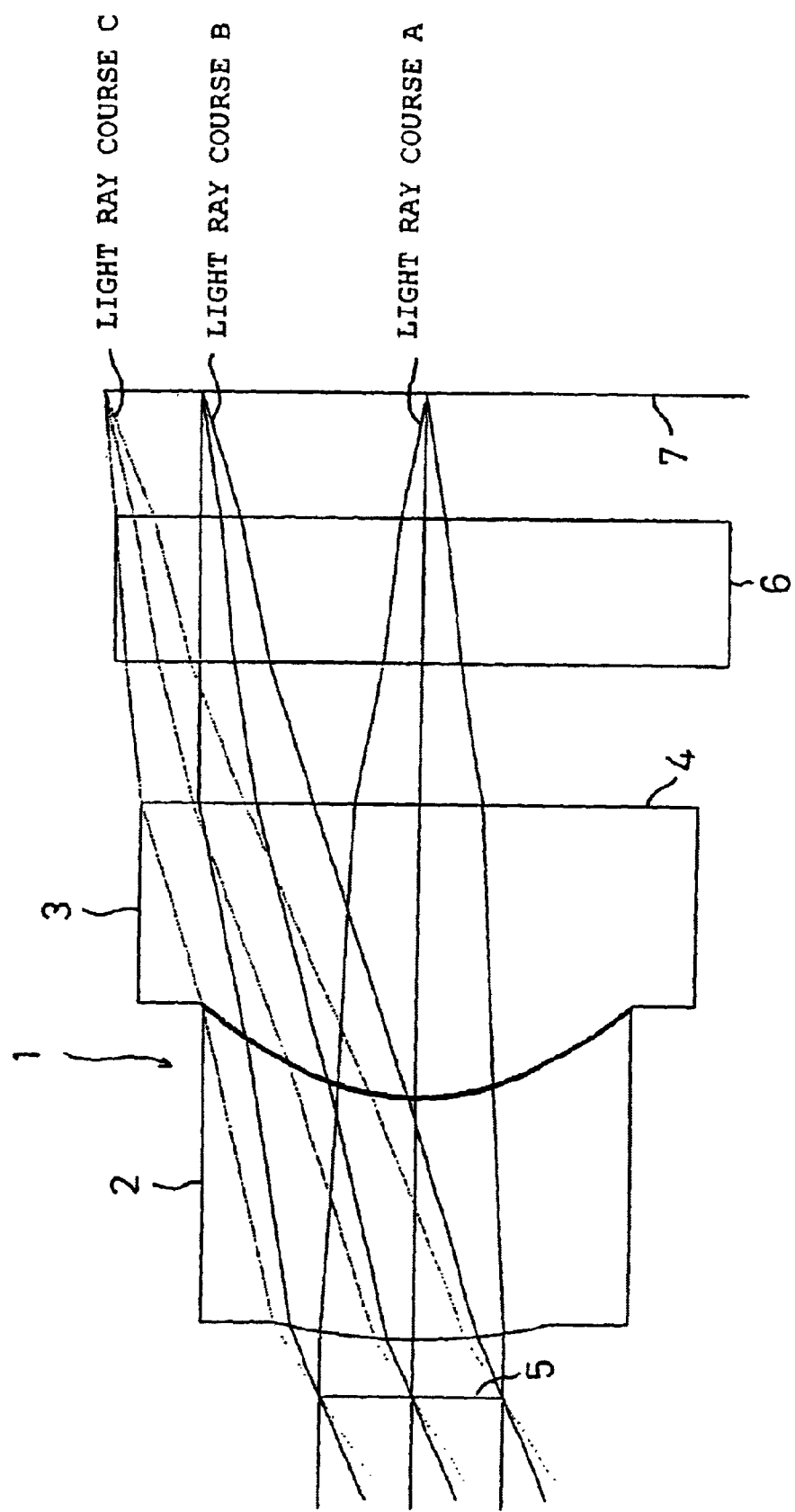
FIG. 6 is an illustration of a first example of the image pickup lens according to the present invention.

FIG. 6 shows a first example of the present invention. In this example, a lens body is formed by integrally forming a first lens piece 2 and a second lens piece 3, as in the image pickup lens shown in FIG. 4. A second face of the second lens piece 3 adjacent an image pick surface is a Fresnel face 4.

The image pickup lens of the first example is set under the following conditions:

f1 = 3.68 mm; F = 2.8; 2ω = 66.4°; and Petzvel sum = 0.344.

| Face | Radius r of curvature | Distance d | Refractive index nd | Abbe constant vd |
|---|---|---|---|---|
| (1) Diaphragm | 0.0000 | 0.396 | | |
| (2) First face of first lens piece | 4.024 | 1.6620 | 1.620 | 24.0 |
| (3) Second face of first lens piece | 1.677 | 0.0200 | | |
| (adhesive layer) | | | 1.492 | 58.0 |
| (4) First face of second lens piece | 1.677 | 2.0520 | 1.543 | 56.0 |
| (5) Second face of second lens piece | −2.391 | 1.0000 | | |
| (6) First face of cover glass | 0.000 | 1.0000 | 1.517 | 64.0 |
| (7) Second face of cover glass | 0.000 | 0.8700 | | |
| (8) Image pickup surface | 0.000 | | | |

| | K | A | b |
|---|---|---|---|
| 2 | 0.0000000e+000 | −7.697852e−003 | 1.748059e−003 |
| 3 | −0.3406813e+000 | −1.720708e−002 | −6.403819e−003 |
| 4 | −0.3406813e+001 | −1.720708e−002 | −6.403819e−003 |
| 5 | −2.6885790e+000 | −1.423590e−002 | 1.669059e−003 |

Chromatic aberrations of magnification in light ray courses A, B and C in the image pickup lens of the first example under such conditions are shown in FIG. 7. It can be seen from FIG. 4 that the chromatic aberration of magnification in any of the light ray courses has been reduced.

Figure 8:
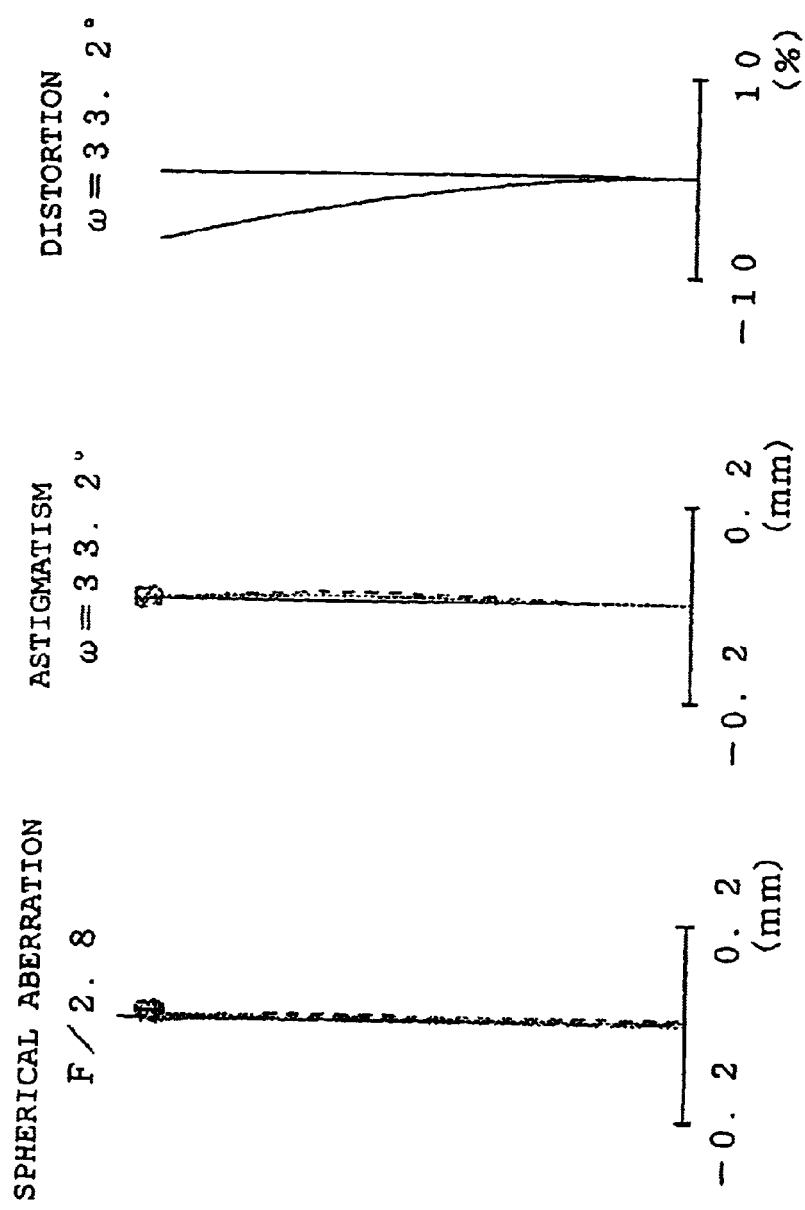
FIG. 8 is a diagram showing spherical aberrations, astigmatisms and distortions of the image pickup lens shown in FIG. 6.

In addition, the spherical aberration, the astigmatism and the distortion in the image pickup lens of the first example are shown in FIG. 8. It can be seen from FIG. 8 that all of the spherical aberration, the astigmatism and the distortion assume substantially satisfactory values, and hence, sufficient optical characteristics can be provided.

Example 2

Figure 9:
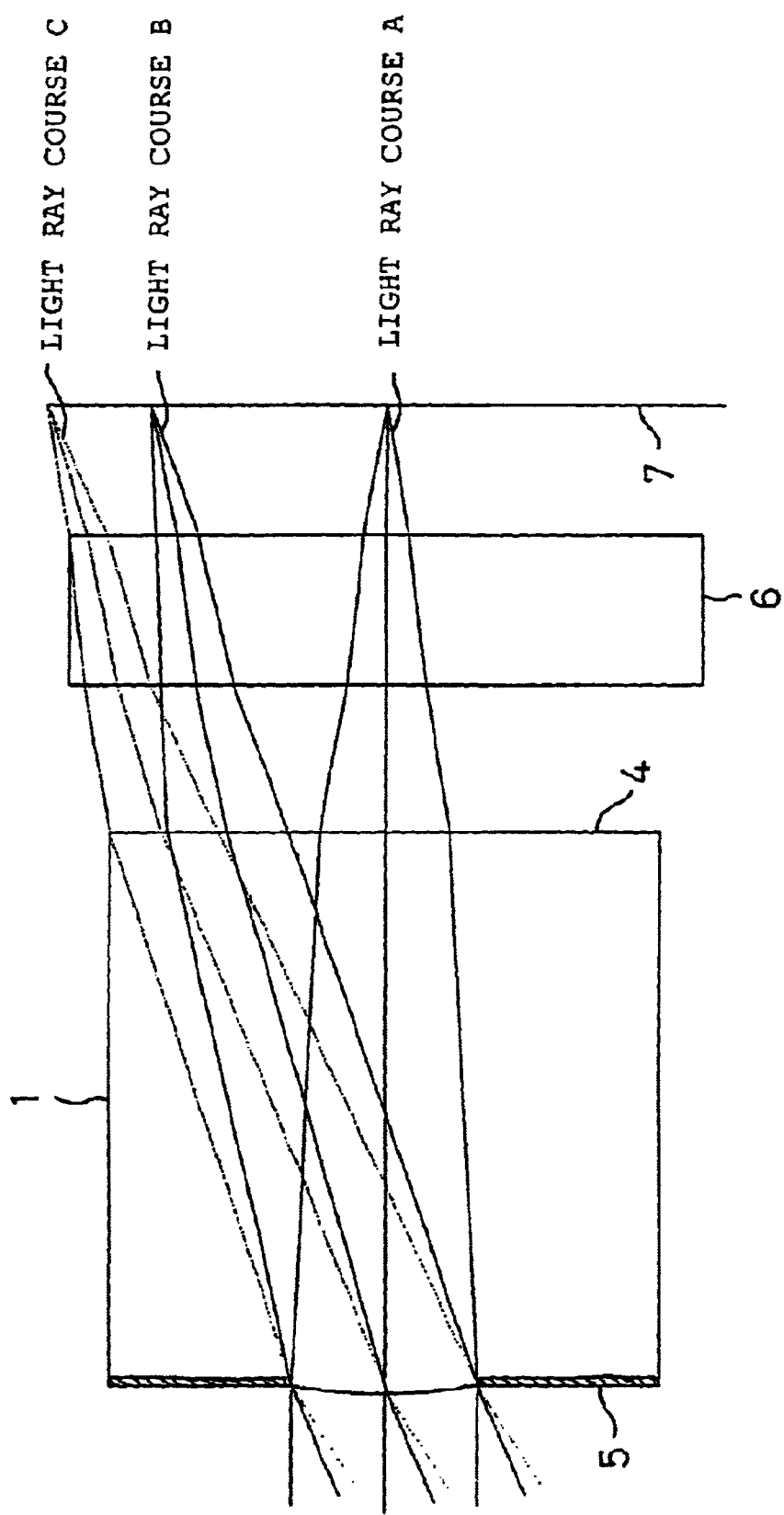
FIG. 9 is an illustration of a second example of the image pickup lens according to the present invention.

FIG. 9 shows a second example of the present invention. In this example, a lens body 1 is constituted by a single lens, and a second face of the lens body 1 adjacent an image pickup surface 7 is a Fresnel face 4, as in the image pickup lens shown in FIG. 5. Further, a diaphragm 5 is disposed on the first face of the lens body 1 adjacent an object.

The image pickup lens of the second example is set under the following conditions:

f1 = 3.68 mm; F = 2.8; 2ω = 67.8°; and Petzvel sum = 0.378.

| Face | Radius r of curvature | Distance d | Refractive index nd | Abbe constant vd |
|---|---|---|---|---|
| (1) First face of lens | 4.018 | 0.050 | 1.492 | 58.0 |
| (2) Diaphragm | 0.000 | 3.750 | 1.492 | 58.0 |
| (3) Second face of lens | −2.282 | 1.000 | | |
| (4) First face of cover glass | 0.000 | 1.000 | 1.517 | 64.0 |
| (5) Second face of cover glass | 0.000 | 0.870 | | |
| (6) Image pickup surface | 0.000 | | | |

| | K | A | B |
|---|---|---|---|
| 1 | −8.672150e−001 | −1.132163e−002 | 1.115832e−002 |
| 3 | −2.780837e+000 | −1.480072e−002 | 1.846219e−003 |

Chromatic aberrations of magnification in light ray courses A, B and C in the image pickup lens of the second example under such conditions are shown in FIG. 10.

Figure 11:
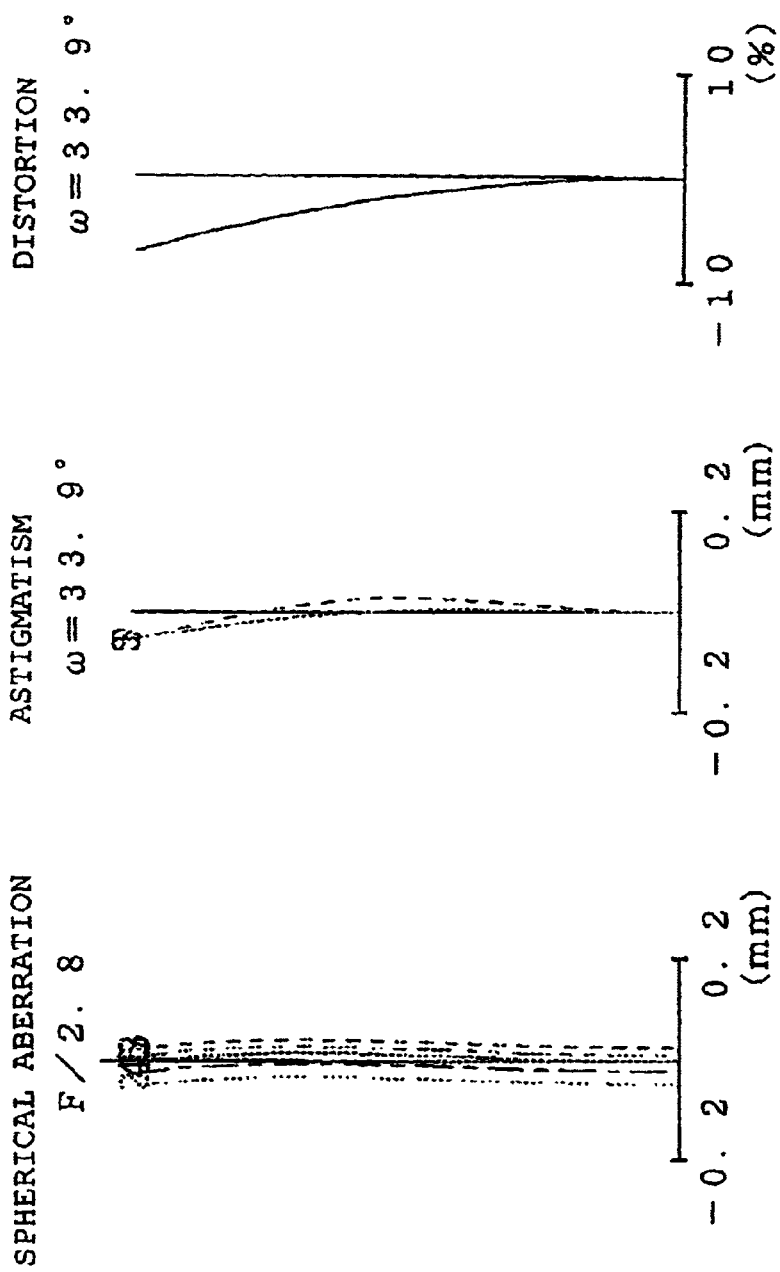
FIG. 11 is a diagram showing spherical aberrations, astigmatisms and distortions of the image pickup lens shown in FIG. 9.

In addition, the spherical aberration, the astigmatism and the distortion in the image pickup lens of the second example are shown in FIG. 11. It can be seen from FIG. 11 that all of the spherical aberration, the astigmatism and the distortion assume substantially satisfactory values, and hence, sufficient optical characteristics can be provided.

Example 3

Figure 12:
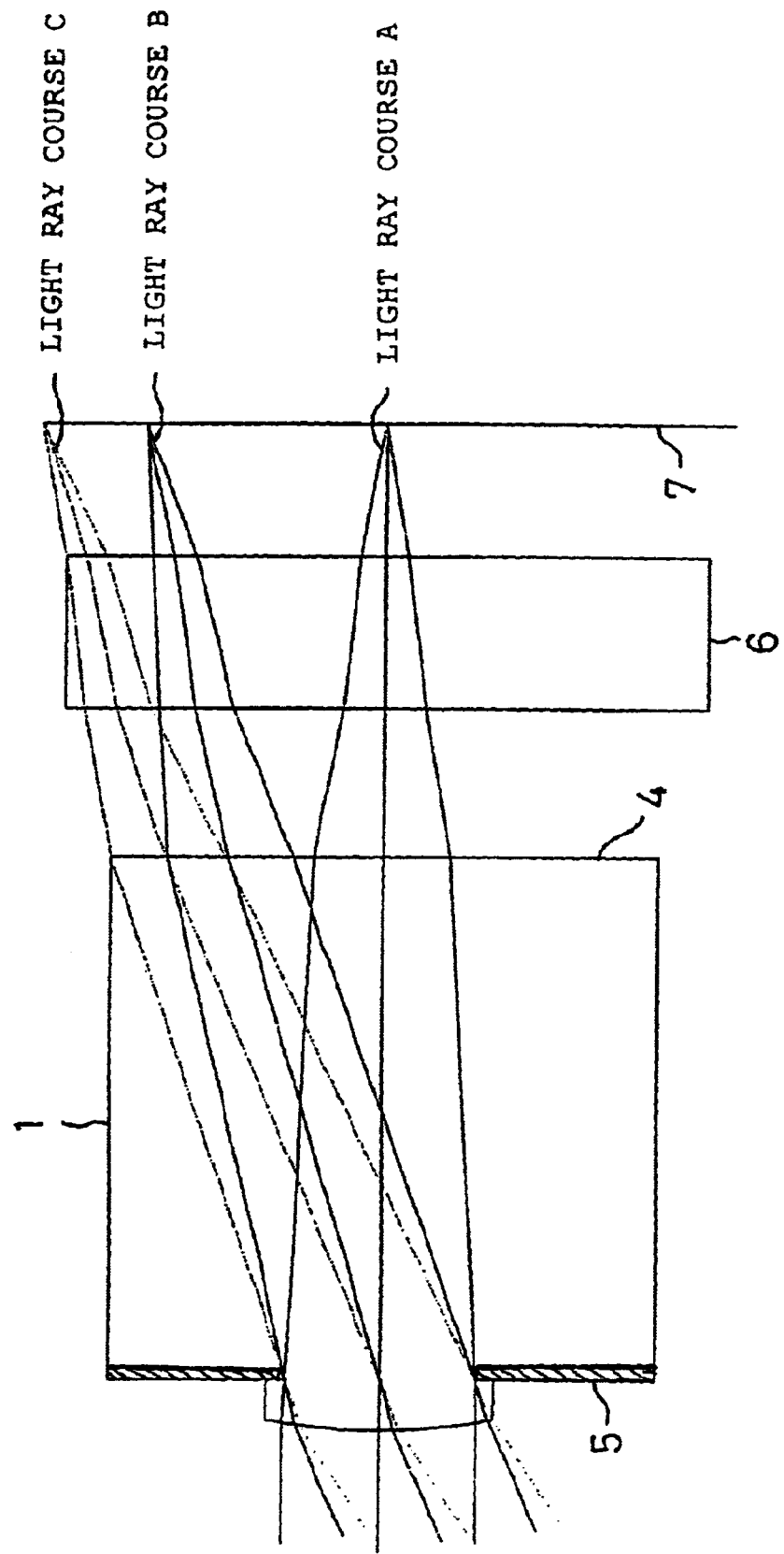
FIG. 12 is an illustration of a third example of the image pickup lens according to the present invention.

FIG. 12 shows a third example of the present invention. In this example, a lens body 1 is constituted by a single lens, and a second face of the lens body 1 adjacent an image pickup surface 7 is a Fresnel face 4, as in the image pickup lens shown in FIG. 5. Further, a diaphragm 5 is disposed at a location closer to the first face between the first face of the lens body 1 adjacent an object and the second face of the lens body 1 adjacent the image pickup surface.

The image pickup lens of the third example is set under the following conditions:

| f1 = 3.68 mm; F = 2.8; 2ω = 68.0°; and Petzvel sum = 0.379. | | | | |
|---|---|---|---|---|
| Face | Radius r of curvature | Distance d | Refractive index nd | Abbe constant vd |
| (1) First face of lens | 4.009 | 0.332 | 1.492 | 58.0 |
| (2) Diaphragm | 0.000 | 3.464 | 1.492 | 58.0 |
| (3) Second face of lens | −2.285 | 1.000 | | |
| (4) First face of cover glass | 0.000 | 1.000 | 1.517 | 64.0 |
| (5) Second face of cover glass | 0.000 | 0.869 | | |
| (6) Image pickup surface | 0.000 | | | |

| | K | A | B |
|---|---|---|---|
| 1 | −1.561189e+000 | −6.132508e−003 | 3.300793e−003 |
| 3 | −3.666782e+000 | −2.174221e−002 | 2.783135e−003 |

Chromatic aberrations of magnification in light ray courses A, B and C in the image pickup lens of the third example under such conditions are shown in FIG. 13.

Figure 14:
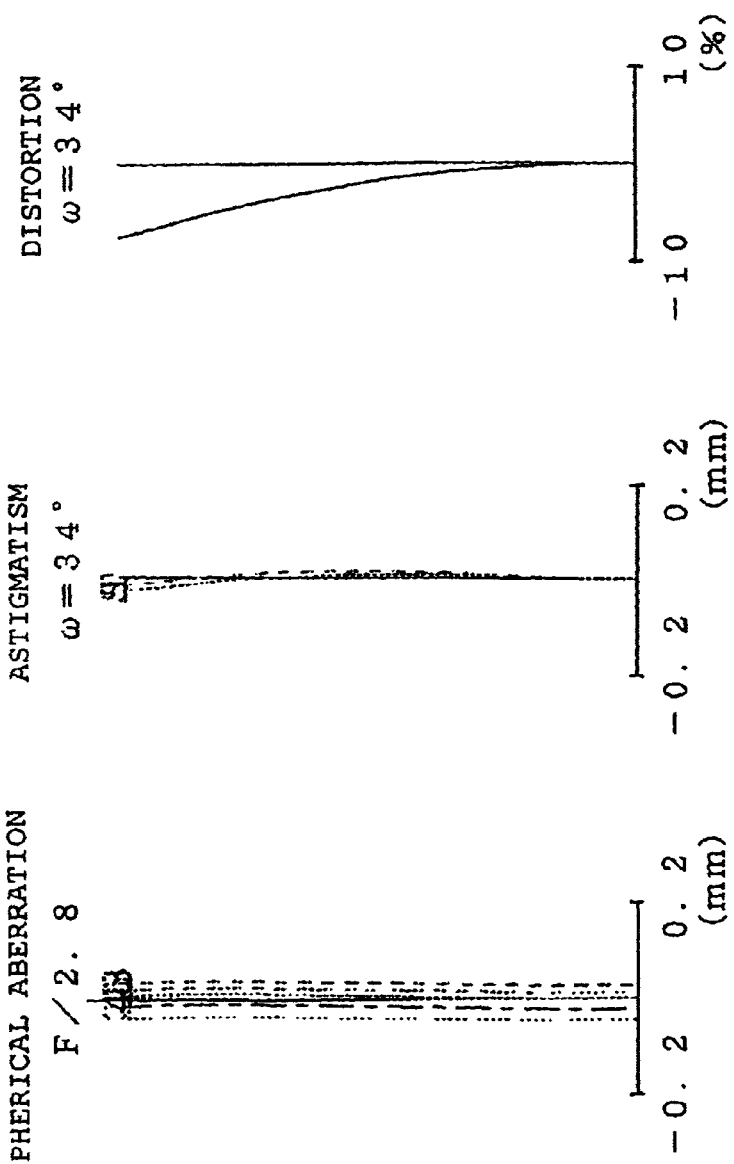
FIG. 14 is a diagram showing spherical aberrations, astigmatisms and distortions of the image pickup lens shown in FIG. 12.

In addition, the spherical aberration, the astigmatism and the distortion in the image pickup lens of the third example are shown in FIG. 14. It can be seen from FIG. 14 that all of the spherical aberration, the astigmatism and the distortion assume substantially satisfactory values, and hence, sufficient optical characteristics can be provided.

Example 4

Figure 15:
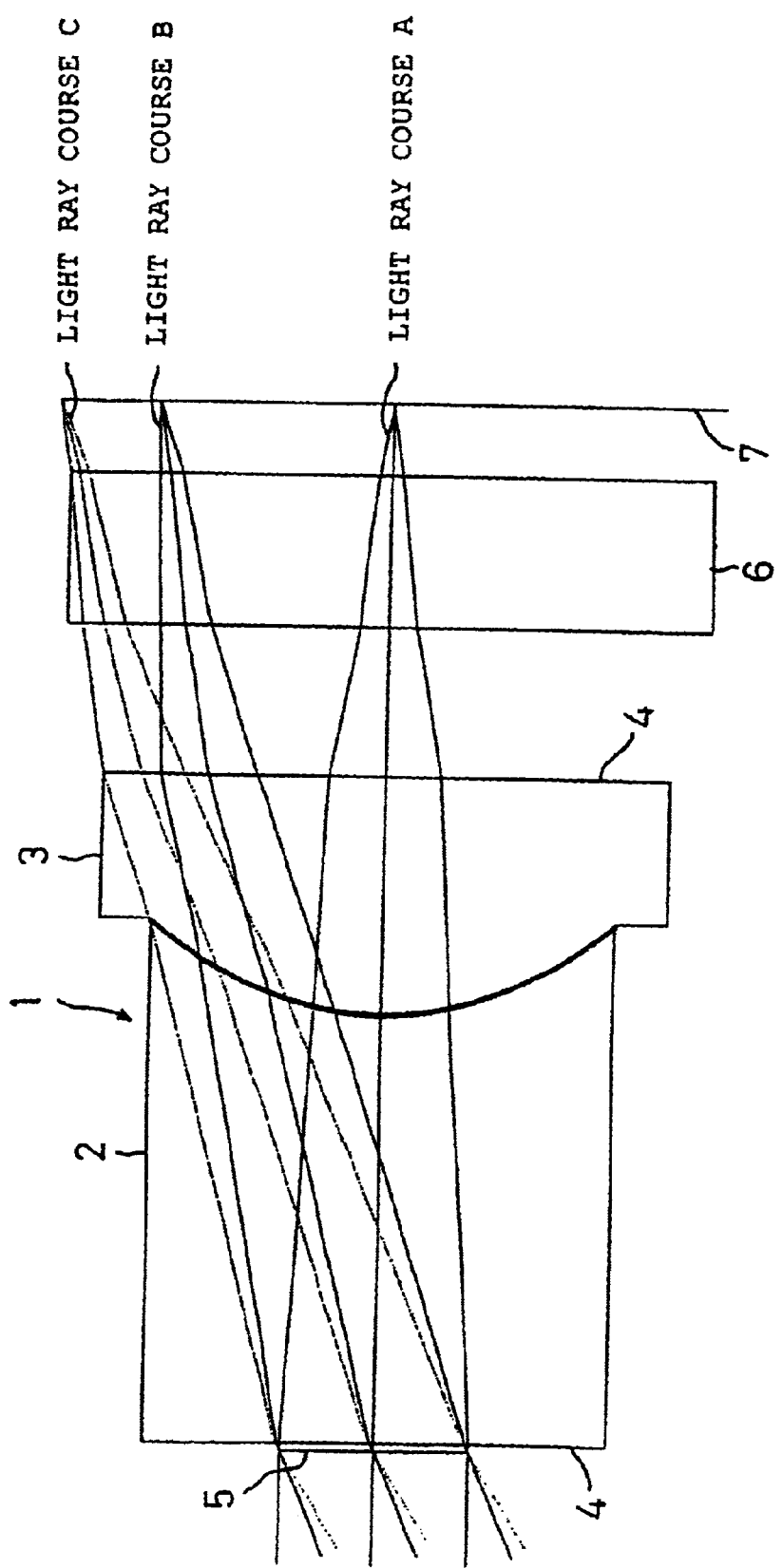
FIG. 15 is an illustration of a fourth example of the image pickup lens according to the present invention.

FIG. 15 shows a fourth example of the present invention. In this example, a lens body 1 is constituted by forming a first lens piece and a second lens piece and bonding them to each other, as in the image pickup lens shown in FIG. 4. Each of a first face of the first lens piece 2 adjacent an object and a second face of the second lens piece 3 adjacent an image pickup surface 7 is a Fresnel face 4.

The image pickup lens of the fourth example is set under the following conditions:

| f1 = 3.68 mm; F = 2.8; 2ω = 63.6°; and Petzvel sum = −0.074. | | | | |
|---|---|---|---|---|
| Face | Radius r of curvature | Distance d | Refractive index nd | Abbe constant vd |
| (1) Diaphragm | 0.0000 | 0.0540 | | |
| (2) First face of first lens piece | 3.906 | 2.8530 | 1.620 | 24.0 |
| (3) Second face of first lens piece | 1.966 | 0.0200 | | |
| (adhesive layer) | | | 1.492 | 58.0 |
| (4) First face of second lens piece | 1.966 | 1.6250 | 1.543 | 56.0 |
| (5) Second face of second lens piece | −2.242 | 1.0000 | | |
| (6) First face of cover glass | 0.000 | 1.0000 | 1.517 | 64.0 |
| (7) Second face of cover glass | 0.000 | 0.4750 | | |
| (8) Image pickup surface | 0.000 | | | |

| | K | A | b |
|---|---|---|---|
| 2 | 0.0000000e+000 | −2.661284e−003 | 1.640092e−003 |
| 3 | −4.783934e+000 | 4.119274e−002 | −4.120893e−003 |
| 4 | −4.783934e+000 | 4.119274e−002 | −4.120893e−003 |
| 5 | −2.625853e+000 | −1.153677e−002 | 1.259310e−003 |

Chromatic aberrations of magnification in light ray courses A, B and C in the image pickup lens of the fourth example under such conditions are shown in FIG. 16. It can be seen from FIG. 6 that the chromatic aberrations of magnification in all of the light ray courses have been reduced.

Figure 17:
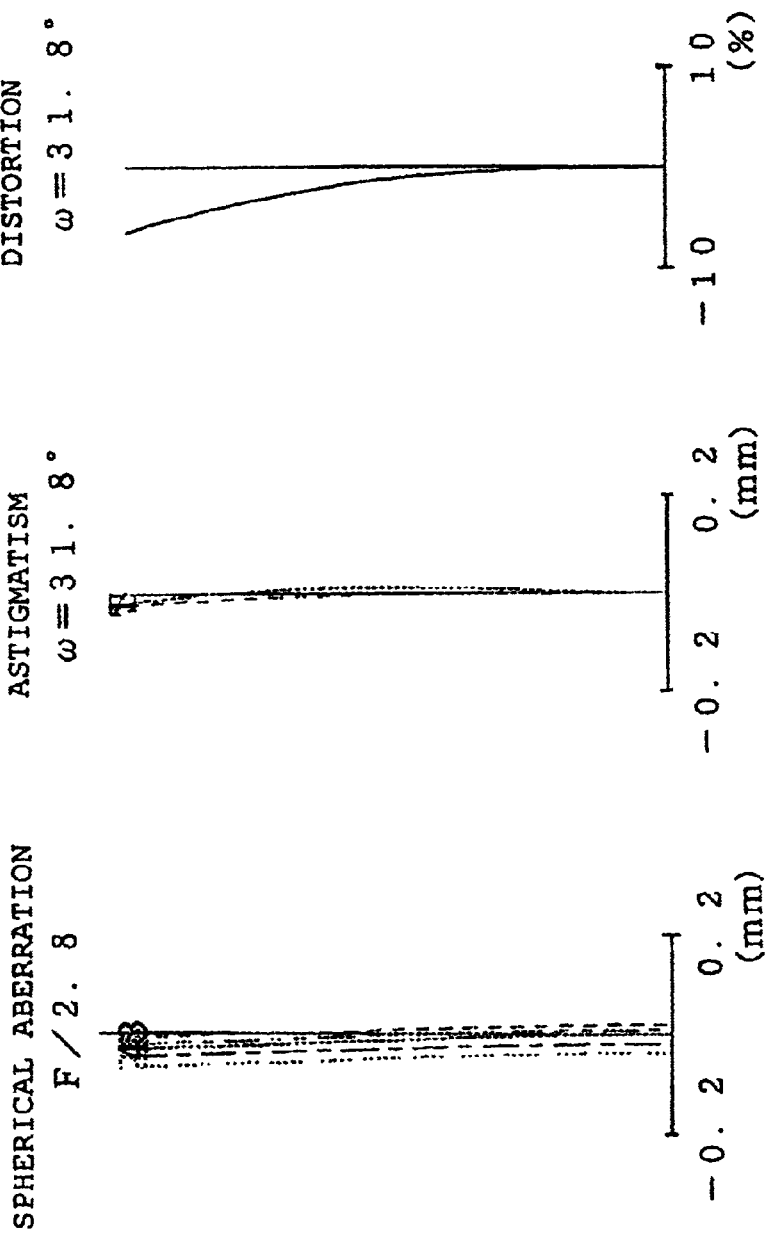
FIG. 17 is a diagram showing spherical aberrations, astigmatisms and distortions of the image pickup lens shown in FIG. 12.

In addition, the spherical aberration, the astigmatism and the distortion in the image pickup lens of the fourth example are shown in FIG. 17. It can be seen from FIG. 17 that all of the spherical aberration, the astigmatism and the distortion assume substantially satisfactory values, and hence, sufficient optical characteristics can be provided.

Although the embodiments of the present invention have been described in detail, it will be understood that the present invention is not limited to the above-described embodiments, and various modifications in design may be made without departing from the spirit and scope of the invention defined in claims.

I claim:

1. An image pickup lens used in a camera that utilizes an image pickup element and including a lens body, wherein a first face of said lens body adjacent an object and a second face of said lens body adjacent an image pickup surface are formed into an aspherical shape, and at least one of said first face of said lens body adjacent said object and said second face of said lens body adjacent said image pickup surface is a flat Fresnel face that is substantially free of diffraction.

2. An image pickup lens according to claim 1, wherein said lens body is comprised of a single lens piece.

3. An image pickup lens according to claim 1, wherein said lens body is formed of a first lens piece and a second lens piece bonded to each other.

4. The image pickup lens according to claim 3, wherein said first lens piece and said second lens piece are made of different materials.

5. The image pickup lens according to any one of claims 1 through 4, wherein said lens is made of resins.

6. The image pickup lens according to claim 3, wherein said first lens piece and said second lens piece are bonded to each other on aspherical surfaces thereof.

7. The image pickup lens according to claim 4, wherein said first lens piece is formed of a polyester-based resin, and said second lens piece is formed of a cyclo-olefin copolymer-based resin.

\* \* \* \* \*